M. RILEY.
Mashing Apparatus.
No. 50,958.  Patented Nov. 14, 1865.
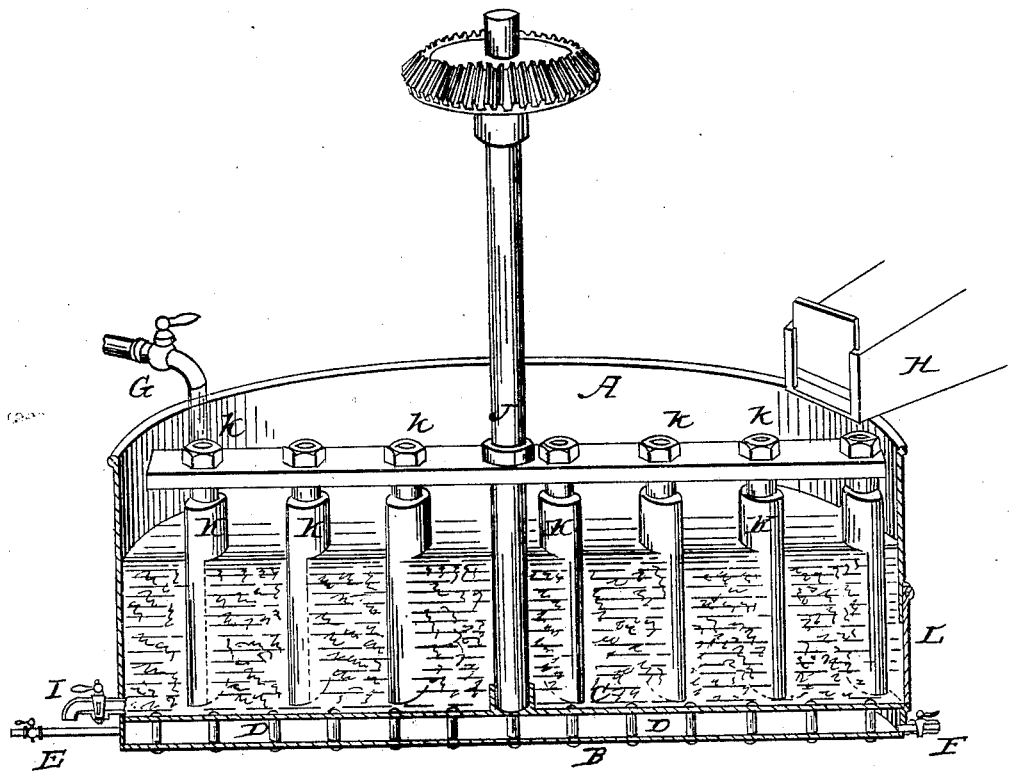

UNITED STATES PATENT OFFICE.

MICHAEL RILEY, OF MORROW, OHIO.

IMPROVED MALTING APPARATUS.

Specification forming part of Letters Patent No. 50,958, dated November 14, 1865.

*To all whom it may concern:*

Be it known that I, MICHAEL RILEY, of Morrow, Warren county, Ohio, have invented a new and useful Malting Apparatus; and I do hereby declare the following to be a full, clear, and exact description thereof, reference being had to the accompanying drawing, making part of this specification.

My invention relates to a provision for the ready, effective, and expeditious steeping, sprouting, and drying of grain in the production or malt.

The accompanying drawing is a sectional perspective view of an apparatus embodying my invention.

A represents a cylindrical vessel, of boiler iron or of copper, and which for a capacity of fifty bushels of malt may be fifteen feet diameter and three feet deep.

About three inches above the bottom B is a false bottom, C, so as to form a space or chamber, D, for the introduction of steam.

E is a cock for the admission of steam into the chamber D.

F is a cock for blowing off water and sediment from the chamber D.

G is a cock for supplying water to the vat.

H is a hopper or spout for supplying grain to the vat.

I is a cock for drawing off the surplus water after steeping.

J is a shaft, revolving axially in the vat. Said shaft is armed with blades K K', of which those, K, on one side are set or feathered so as to move the grain toward the circumference, while those, K', on the other side are so set as to move the grain toward the center.

L is a gate, through which the malt is extended by the agitator J K K' when the drying is completed.

Operation: Fill the vat about half-full of grain, and let in water enough to properly steep the same for soaking, discharging any surplus water through the cock I. The soaking operation will usually be complete in forty-eight hours, and in cold weather may be expedited by the admission of a small quantity of steam into the chamber D. Having drawn off the surplus water the grain is then allowed forty-eight hours longer to sprout, the process being again expedited in cold weather by admitting low steam into the chamber D. When sufficiently sprouted a full head of steam at about forty pounds pressure, is let into the chamber, and the agitator started to revolving until the contents are sufficiently dried. This, in my apparatus, will take about twenty-four hours for barley and other small grain, and forty-eight hours for corn. When the steam is shut off and the gate L being opened the malt is discharged therethrough by the action of the agitator.

My apparatus effects a great saving of time, labor, space, and grain over the common mode of steeping in one vessel, then moving to a cellar to sprout, and again shifting the grain into a kiln. Moreover, the drying being wholly automatic, it is as easy to dry Indian corn as barley, thus saving seventy-five per cent. in the cost of grain for a given production of alcohol.

The blades K K', being secured by nuts K, are adjustable in their feather, so as to move the corn toward or from the center, as may be desired.

I claim herein as new and of my invention—

1. The arrangement of vat A, steam-space D, and agitator J K K', or their equivalents, for the purpose set forth.

2. The arrangement of adjustable feathering-blades K k K' k', for the purpose set forth.

In testimony of which invention I hereunto set my hand.

MICHAEL RILEY.

Witnesses:
GEO. H. KNIGHT,
JAMES H. LAYMAN.